United States Patent
Osypiuk et al.

(10) Patent No.: US 10,793,287 B2
(45) Date of Patent: Oct. 6, 2020

(54) METHOD FOR CONTROLLING WARNING LIGHTS OF AN UNMANNED AERIAL VEHICLE AND A SYSTEM FOR APPLICATION THEREOF

(71) Applicant: Aerobits Sp. z o.o., Szczecin (PL)

(72) Inventors: Rafal Osypiuk, Szczecin (PL); Mateusz Spychala, Szczecin (PL)

(73) Assignee: AEROBITS SP. Z O.O., Szczecin (PL)

(*) Notice: Subject to any disclaimer, the term of this patent is extended or adjusted under 35 U.S.C. 154(b) by 223 days.

(21) Appl. No.: 15/953,340

(22) Filed: Apr. 13, 2018

(65) Prior Publication Data
US 2018/0305039 A1    Oct. 25, 2018

(30) Foreign Application Priority Data
Apr. 21, 2017    (PL) .......................................... 421360

(51) Int. Cl.
*B64D 47/02*    (2006.01)
*B64C 39/02*    (2006.01)
(Continued)

(52) U.S. Cl.
CPC ............. *B64D 47/02* (2013.01); *B60Q 1/525* (2013.01); *B64C 39/024* (2013.01); *B64D 47/06* (2013.01);
(Continued)

(58) Field of Classification Search
CPC ........ B64D 47/02; B64D 47/06; B60Q 1/525; G08G 5/0021; G08G 5/0069; G08G 5/045; G08G 5/0008; G08G 5/04
See application file for complete search history.

(56) References Cited

U.S. PATENT DOCUMENTS 5,136,512 A * 8/1992 Le Borne ............... G01O 5/005
                                                340/970
5,313,201 A * 5/1994 Ryan .................... G01S 13/9303
                                                340/961
(Continued)

FOREIGN PATENT DOCUMENTS

CN    205060034 U    3/2016
WO    2009/012231 A1    1/2009
(Continued)

OTHER PUBLICATIONS

EPO, Extended European Search Report dated Aug. 27, 2018 in European Patent Application No. 18167280.9, 8 pages.
(Continued)

*Primary Examiner* — Mussa A Shaawat
(74) *Attorney, Agent, or Firm* — Masuvalley & Partners

(57) ABSTRACT

A method for controlling the warning lights of an unmanned aerial vehicle, in a system, in which one or more light modules are connected to a controller (1), which controller (1) is also connected via a communication interface (5) to a decision subsystem (6) adapted to receive an activation signal from a delivery module (7, 8, 9, 10) providing the activation signal, which method comprises the following steps:
  a) delivery of the activation signal by the delivery module (7, 8, 9, 10) providing the activation signal to the decision subsystem (6),
  b) generation of a request to turn the warning lights (4) on or off by the decision subsystem (6) based on the activation signal, and transfer of this request via the interface (5) to the controller (1),
  c) turning the warning lights (4) on or off by the controller (1) according to the request received in step b).
(Continued)

The invention comprises also a system for application of this method.

15 Claims, 1 Drawing Sheet

(51) Int. Cl.
| | |
|---|---|
| *G08G 5/00* | (2006.01) |
| *G08G 5/04* | (2006.01) |
| *H05B 37/02* | (2006.01) |
| *B60Q 1/52* | (2006.01) |
| *B64D 47/06* | (2006.01) |
| *H05B 47/11* | (2020.01) |
| *H05B 47/105* | (2020.01) |

(52) U.S. Cl.
CPC ......... *G08G 5/0008* (2013.01); *G08G 5/0013* (2013.01); *G08G 5/0021* (2013.01); *G08G 5/0069* (2013.01); *G08G 5/04* (2013.01); *G08G 5/045* (2013.01); *H05B 47/105* (2020.01); *H05B 47/11* (2020.01)

(56) References Cited

U.S. PATENT DOCUMENTS

| | | | | |
|---|---|---|---|---|
| 5,506,590 | A * | 4/1996 | Minter | G01S 13/762 |
| | | | | 342/417 |
| 5,570,095 | A * | 10/1996 | Drouilhet, Jr. | G01S 5/0072 |
| | | | | 342/357.31 |
| 5,933,099 | A * | 8/1999 | Mahon | G08G 5/0078 |
| | | | | 340/945 |
| 6,252,525 | B1 | 6/2001 | Philiben | |
| 6,804,607 | B1 * | 10/2004 | Wood | G01S 17/86 |
| | | | | 701/301 |
| 7,999,698 | B2 | 8/2011 | Annati et al. | |
| 9,524,648 | B1 * | 12/2016 | Gopalakrishnan | H04K 3/224 |
| 9,697,655 | B1 * | 7/2017 | Eyhorn | G07C 5/0825 |
| 10,065,638 | B1 * | 9/2018 | Wood | G05D 1/0212 |
| 2009/0303081 | A1 * | 12/2009 | Annati | B64D 47/06 |
| | | | | 340/945 |
| 2012/0319871 | A1 | 12/2012 | Wise | |
| 2016/0247407 | A1 * | 8/2016 | Paczan | G08G 5/045 |
| 2017/0256147 | A1 * | 9/2017 | Shanahan | G08G 1/164 |
| 2017/0355469 | A1 * | 12/2017 | Canning | B64D 47/06 |
| 2018/0029522 | A1 * | 2/2018 | Gordon | B60Q 1/0017 |
| 2018/0107213 | A1 * | 4/2018 | Kuhara | G05D 1/0033 |
| 2018/0109223 | A1 * | 4/2018 | Panas | H02S 20/32 |
| 2018/0253980 | A1 * | 9/2018 | Mohamadi | G08G 5/0052 |
| 2018/0259641 | A1 * | 9/2018 | Vacanti | G01S 13/953 |

FOREIGN PATENT DOCUMENTS

| | | |
|---|---|---|
| WO | 2016/137982 A1 | 9/2016 |
| WO | 2016137982 A1 | 9/2016 |

OTHER PUBLICATIONS

ESR Communication dated Aug. 27, 2018 Application No. 181672809-1204, 8 pages.

\* cited by examiner

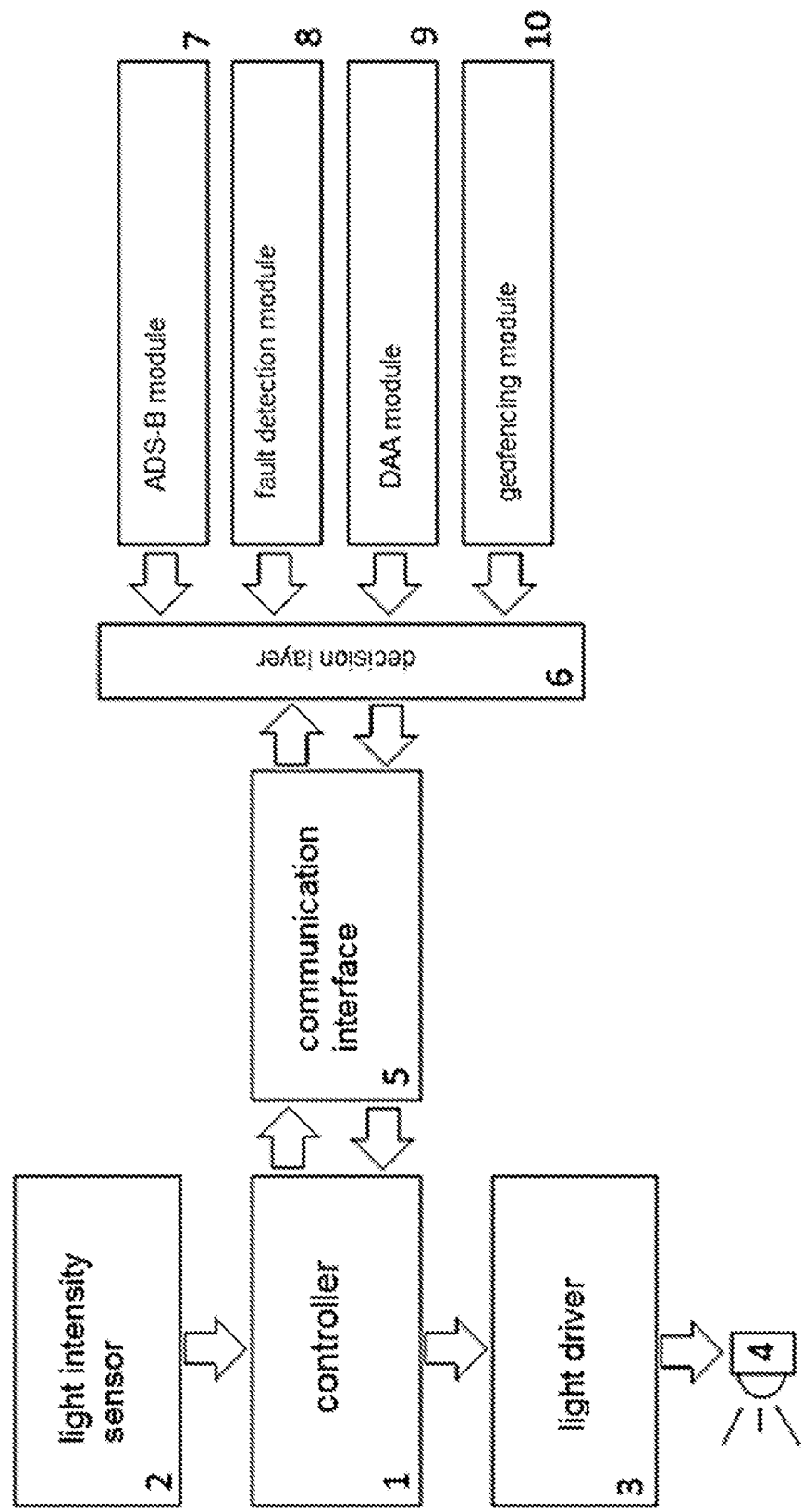

METHOD FOR CONTROLLING WARNING LIGHTS OF AN UNMANNED AERIAL VEHICLE AND A SYSTEM FOR APPLICATION THEREOF

The present invention relates to a method for controlling warning lights of an unmanned aerial vehicle, resulting in particular in activation of flashing lights in the case this unmanned aerial vehicle excessively approaches another aircraft, and a system designed to implement this method.

STATE OF THE ART

U.S. Pat. No. 7,999,698B2 describes the use of lights mounted on an aircraft as anti-collision elements activated in areas which are determined using data from a global positioning system (GPS) and the on-board computer. Such solution is complex and does not respond to separation infringement. The anti-collision lights are turned on in a dedicated area only and stay turned on regardless of whether it is really necessary to warn other aircraft.

An SAA (Sense and Avoid) or DAA (Detect and Avoid) technology based collision avoidance system using various sensors for detection of potential threats is known in the state of the art. In particular, aircraft are equipped with on-board transmitting devices (e.g., transponders, ADS-B), transmitting information about their position in the UHF (Ultra High Frequency) band. Using a mounted device identifying the air traffic nearby, the approaching aircraft determines relative positions of other objects, reporting separation infringement. This system is not connected to the warning lights system placed on the aircraft and has an informative role.

U.S. Pat. No. 6,252,525B1 discloses an anti-collision system that uses information gained by a standard TCAS and TCAS II transceiver, in which the signal transmitter is connected to a computer, which turns on the anti-collision lights in the case of excessive proximity of another aircraft or obstruction. TCAS and TCAS II are two-band and two-way radio communication systems, where transmission takes place on a different frequency than reception (1030 MHz and 1090 MHz, respectively). The system is based on a directional antenna placed on the aircraft, querying other aircraft or obstructions. When such query is received, the obstruction or other aircraft sends a response with information about its position and movement (vector), and the computer located on the aircraft sending the query analyzes the received data for collision risk and proposes a solution to the collision situation if necessary. Such a system is a complex two-way radio communication system, requiring high power supply and a set of directional antennas located on the aircraft.

In US20120319871A1 an aircraft communicates with other aircraft using an ADS-B type two-way radio communication system and a GPS receiver mounted on the aircraft. At constant time intervals, the aircraft retrieves information about its location and distributes it by means of a radio transmitter on the 1090 MHz frequency of the ADS-B system. When received by another aircraft, such information is processed and analyzed. Similarly to U.S. Pat. No. 6,252,525B1, such a system is a complex two-way radio communication system, requiring high power supply and a set of directional antennas located on the aircraft.

WO2009012231 (A1) reports a ground-based radar system for handling ground obstructions, especially wind farms. The disclosed system includes radar or another device, monitoring the space nearby. When the radar detects objects in this space, the system activates the anti-collision lights installed on the ground-based obstructions, e.g., windmills in wind farms. The disclosed solution relates to a ground-based infrastructure that is based on a local wireless communication network.

In the state of the art, a development of the Fraunhofer Institute for High Frequency Physics and Radar Techniques FHR is known, reporting a system for turning off anti-collision lights in high ground-based infrastructure, especially wind turbines, in order to save energy and reduce light pollution in the surrounding when there is no aircraft nearby. The system detects the appearance of an aircraft nearby by receiving a broadband radio signal in the UWB band, and in such case turns on the anti-collision lights. The reported solution makes use of a passive radar technology, which analyzes the phase shift of the received radio signal in line with approaching of the aircraft, and based on this data calculates speed, direction and distance from the object. Such solution is very complex and requires using a complex radar technology. The proposed radar antennas have large dimensions and weight, which excludes them from being used in aircraft, especially as small as drones.

Document CN205060034U discloses an unmanned vehicles convenient to observe belongs to the unmanned aerial vehicle field. Unmanned vehicles includes major structure part, the crucial position of periphery and drive the rotor subassembly of unmanned vehicles main part, the rotor subassembly includes at least three group's screws, the screw encircles the unmanned vehicles main part sets up, at least the coating of major structure part has extinction material coating. The utility model discloses a take extinction material coating design in unmanned vehicle's major structures such as fuselage part, set up position and the state of flight that initiative light emitting component was used for indicating unmanned vehicles in the profile part of crucial position of periphery and/or fuselage simultaneously, unmanned vehicles to controlling in the horizon range like this for the degree of discerning of aircraft itself improves greatly.

Document U.S. Pat. No. 5,933,099A discloses a collision avoidance system for a warning aircraft includes a transmitter and receiver for interrogating the transponder of a warned aircraft. A computer to be installed in the warning aircraft is programmed with the distances or rates of closure at which the warning aircraft and the warned aircraft constitute traffic for one another. When the computer has determined that the warning aircraft and a warned aircraft constitute traffic for one another, a warning system broadcast an appropriate vocal warning.

Essence of the Invention

Therefore, the aim of the present invention is to minimize the consumption of energy needed for power supply of the warning lights in an unmanned aerial vehicle and to provide automatic activation of the anti-collision lights in order to increase the safety of air traffic with participation of the unmanned aerial vehicle.

A method for controlling the warning lights of an unmanned aerial vehicle, in a system, in which one or more light modules are connected to a controller, which controller is also connected via a communication interface to a decision subsystem adapted to receive an activation signal from a delivery module providing the activation signal, according to the invention is characterized in that it comprises the following steps:

a) delivery of the activation signal by the delivery module providing the activation signal to the decision subsystem,
b) generation of a request to turn the warning lights on or off by the decision subsystem based on the activation signal, and transfer of this request via the interface to the controller,
c) turning the warning lights on or off by the controller according to the request received in step b).

Preferably, a controller additionally connected to an ambient light sensor is used and the power of the warning lights is controlled depending on the ambient light intensity, in particular in that the power of the warning lights is reduced as the ambient light intensity decreases.

Preferably, a delivery module is used that is adapted to receive one or more of the following signals from known air traffic safety systems, which may be generated by sources such as other aircraft or ground equipment: SAA (Sense and Avoid) or DAA (Detect and Avoid), ADS-B Mode A/C/S (Automatic Dependent Surveillance-Broadcast, Mode A/C/S), TCAS (Traffic Alert and Collision Avoidance System), TCAS-II (Traffic Alert and Collision Avoidance System II), wherein said delivery module provides the one or more of the following signals as the activation signal.

Preferably, in step b) the power of the activation signal is analyzed and in the case it exceeds a present threshold value—a request to turn the warning lights on or off is generated.

Preferably, in step b) the information contained in the activation signal, in particular that including the position and speed of the source of the signal, is analyzed, this information is compared with the position and speed data of the unmanned aerial vehicle and in the case of finding a risk of excessive approaching or collision of the source and the unmanned aerial vehicle—a request to turn the warning lights on or off is generated.

Preferably, a delivery module is used which generates an activation signal due to failure of one or more subsystems of the unmanned aerial vehicle, in particular a communication subsystem with the operator, due to the recognition of an object flying near the unmanned aerial vehicle by vision technology or due to the unmanned aerial vehicle exit beyond the permitted flight space.

Preferably, a delivery module located on an unmanned aerial vehicle is used.

Preferably, a delivery module is used which is located outside the unmanned aerial vehicle, in particular on the ground.

Preferably, LED lighting modules or discharge lamps (so called "burners") are used, preferably neon, mercury, argon, sodium, xenon, metal halogen, fluorescent ones.

The invention also includes a system for controlling the warning lights of an unmanned aerial vehicle, characterized in that it comprises one or more light modules, in particular LED or discharge lamps, connected to a controller, which controller is also connected via a communication interface to a decision subsystem adapted to receive an activation signal from a delivery module providing the activation signal, wherein these elements are configured and programmed so that:
  a) the delivery module can provide the activation signal to the decision subsystem,
  b) the decision subsystem can generate a request to turn the warning lights on or off based on the activation signal and transfer this request via the interface to the controller,
  c) the controller can turn the warning lights on or off according to the request from the decision subsystem.

Preferably, it additionally comprises an ambient light sensor connected to a controller, wherein the controller is configured and programmed so that it can control the power of the warning lights depending on the ambient light intensity, in particular in that the power of the warning lights is reduced as the ambient light intensity decreases.

Preferably, the delivery module is adapted to receive one or more of the following signals from known air traffic safety systems, which may be generated by sources such as other aircraft or ground equipment: SAA (Sense and Avoid) or DAA (Detect and Avoid), ADS-B Mode A/C/S (Automatic Dependent Surveillance-Broadcast, Mode A/C/S), TCAS (Traffic Alert and Collision Avoidance System), TCAS-II (Traffic Alert and Collision Avoidance System II), wherein said delivery module is configured and programmed so that it provides the one or more of the following signals as the activation signal.

Preferably, the decision subsystem is configured and programmed so that it can analyze the power of the activation signal and/or information contained in the activation signal, in particular that including the position and speed of the source of this signal.

Preferably, the delivery module is configured and programmed so that it can generate the activation signal due to failure of one or more subsystems of an unmanned aerial vehicle, in particular a communication subsystem with the operator, due to the recognition of an object flying near the unmanned aerial vehicle by vision technology or due to the unmanned aerial vehicle exit beyond the permitted flight space.

Preferably, the delivery module is located on the unmanned aerial vehicle or located outside the unmanned aerial vehicle, in particular on the ground.

PREFERRED EMBODIMENTS

The invention will now be described in more detail in preferred embodiments, with reference to the accompanying figure, wherein:

FIG. 1 shows a block diagram illustrating the operation of the method according to the invention and the structure of the system according to the invention in a preferred embodiment, wherein the following markings are used: 1—controller, 2—light intensity sensor, 3—driver, 4—light source, 5—communication interface, 6—decision layer, 7—ADS-B module, 8—fault detection module, 9—DAA module, 10—geofencing module.

In the description below, the terms "unmanned aerial vehicle" and "drone" are used as synonyms.

Below the structure of the system according to the invention is described in more detail:

1—Single anti-collision light module controller. It has essentially three tasks. First, it communicates with the ambient light intensity sensor 2. Based on this information it forms the signal for the driver 3 of the anti-collision light 4. The controller also handles communication with the decision layer, which issues request to turn anti-collision lights on or off.

2—Light intensity sensor. It allows for intelligent adaptation of the warning lights intensity to ambient conditions. For example, there is no need to use 100% of the warning lights power at night. Thus, the intensity of the warning lights is the stronger the more light in the environment.

3—LED diodes are used as the light source. The invention is, however, not limited to this light source, as other sources can be successfully used. Regardless of the source, it is necessary to use a lighting driver, which appropriately forms a firing electrical signal.

4—Light source—for example LED, burner, xenon, etc.

5—Single light module is connected to power supply and to decision system, which controls activation or deactivation of lighting. A simple PWM control output or CAN communication can be used. The first and the second method allow connecting multiple modules in a network. The invention is not, however, limited to this specific communication interface, because there are many and potentially each of them is suitable, for example UART, SPI, I2C, USB, Ethernet, etc.

6—Decision layer, which can be, for example, an unmanned aerial vehicle driver. It is symbolically drawn, because the anti-collision lights can be directly connected to an autonomous decision system related to a single state (e.g., radio communication failure, approaching aircraft, drone exit outside the designated zone, etc.) or connected to a superior drone control system, which is a central unit.

7—Module enabling the use of ADS-B and Mode-A/C/S technologies for activation of anti-collision lights. Information on the existence or position of aircraft in the immediate vicinity of the drone can be an activator/deactivator of the anti-collision lighting. However, much easier ways to activate can be envisioned.

8—Fault detection module for activation of lights as a result of failure of one of the drone subsystems, e.g., communication with the operator.

9—DAA module for activation of lights as a result of the recognition of a flying object, for example by means of vision technology.

10—Geofencing module for activation of lights in the case the drone exits outside the assumed flight zone (geofencing technology).

Example 1 (Listening to Signals from Other Aircraft)

In a preferred embodiment, the method of warning aircraft against excessive approach consisting in activation of lighting 4, for example flash lighting, in the case of excessive approach, including the use of high-energy anti-collision lights installed on the first unmanned aerial vehicle, consists in receiving any radio signal, in particular, for example, an interrogation signal sent by an aircraft located nearby, by the first unmanned aerial vehicle, for example UAV (Unmanned Aerial Vehicle), drone, etc., by listening to radio signals in the UHF band with a SDR (Software Defined Radio) receiver mounted on the first unmanned aerial vehicle. A broadband receiver listens to the entire band, but sends for further analysis only signals received on frequencies specific to a given anti-collision system (e.g., for ADS-B, Mode A/C/S, it is 1090 MHz).

The received signal or part thereof is analyzed for power. If the power of the received signal is high enough, it means that there is an aircraft, vehicle or ground obstruction that emits a radio signal nearby. If the first unmanned aerial vehicle does not have other information about possible obstructions (e.g., based on the saved geographical position of the obstruction), and no additional information about the signal's source can be read from the received signal, then, without a further signal analysis, high power anti-collision lights 4, preferably of a LED type, are turned on the first aircraft. The high energy anti-collision lights emit flash light and are controlled by a PWM (Pulse Width Modulation) pulse signal. As a result, the first aircraft emits a high energy anti-collision flash light and becomes clearly visible to other manned aircraft and operators of other unmanned aerial vehicle in the vicinity of the aircraft receiving the signal. This minimizes the likelihood of collision of a manned or unmanned aerial vehicle with the first unmanned aerial vehicle that received the signal.

When the signal received by the first unmanned aerial vehicle is of sufficient power to be analyzed—it is analyzed to decode information about its source, geographical position, direction of motion and speed of the object that transmits this signal. If the analysis is successful—the received information is compared with the position, speed and direction of motion of the first unmanned aerial vehicle that received the signal, and if it is possible that the aircraft approach excessively each other, the anti-collision lights 4, especially high power, preferably LED type lights are turned on the first aircraft.

At the same time, the high-energy anti-collision lights 4 remain off when there is no risk of infringement of the first unmanned aerial vehicle separation, which significantly reduces the energy consumption and unnecessary air pollution.

In the preferred embodiment cited here, the system of PWM signal controlled, high-energy LED type anti-collision lights is mounted on an unmanned aerial vehicle.

In the preferred embodiment cited here, the operation of the system consisting in receiving a radio signal from the UHF band is described. Alternatively, it is possible to use other methods of aircraft identification, e.g., vision systems or on-board radars using another radio signal band suitable for such communication, especially LF, MF, HF, VHF, UHF, SHF, EHF and THF bands. Generally—every signal emitted by another aircraft, which signal can be received by the first unmanned aerial vehicle, possibly processed by the decision layer 6, is suitable as a source of information for the controller 1 to activate the anti-collision light 4.

In the preferred embodiment cited here, LED type anti-collision lights 4 are described. Alternatively, it is possible to use any kind of lights suitable for visual warning, e.g., xenon.

In the preferred embodiment cited here, the system of PWM signal controlled, high-energy LED type anti-collision lights is described. Alternatively, it is possible to use any kind of control, which is capable of activating lights, in particular to use a digital or analogue electrical, optical or radio signal.

In the preferred embodiment cited here, an anti-collision lights activation system installed in an unmanned aerial vehicle is described. Alternatively, it can be mounted on the ground and send the activation signal for anti-collision lights 4 by means of a digital or analogue optical, radar or radio signal, in particular in the UHF band.

Example 2 (Failure)

In another embodiment, the anti-collision lights 4 installed in the first unmanned aerial vehicle are additionally activated in the case the system detects a fault in the aircraft by means of the fault detection module 8 (e.g., a failure of one of the drone subsystems) or a risk of collision/collision with an obstruction or terrain with the DAA (Detect and Avoid) module 9. In this case, the anti-collision lights 4 may remain on as long as possible. Thanks to this, the damaged first aircraft can be bypassed by other airspace users. In case the first aircraft falls to the ground or gets stuck on an obstruction, such as a tree, it will be easy to find it.

Example 3 (Geofencing)

In another embodiment, the anti-collision lights 4 installed in the first unmanned aerial vehicle are additionally activated in the case the aircraft leaves intentionally or unintentionally a specified airspace. The airspace is defined earlier as a spatial solid or its projection on the ground surface (area) in which the first aircraft can stay and move. The specified space can be defined and saved in the geofencing module 10 of the first aircraft or sent to it in a wireless mode, e.g., via Wi-Fi.

Space can also be defined as an infinite space with the inclusion of a reserved space. The reserved space can be a solid or its projection on the ground surface in which the first aircraft is not allowed to stay.

In a practical embodiment, the space where the first aircraft can stay and move, is a combination of one or more specified permitted airspaces, in which the first aircraft may stay, with one or more specified excluded airspaces, in which the first aircraft cannot stay.

Example 4 (Vision Detection)

In another embodiment, signal lights installed on the first unmanned aerial vehicle are activated additionally when the object flying near the first unmanned aerial vehicle is detected using vision technology.

In the preferred embodiments cited here, a system mounted on an unmanned aerial vehicle is described. Alternatively, it can be mounted on any aircraft, both manned and unmanned.

The invention claimed is:

1. A method for controlling the warning lights of an unmanned aerial vehicle, in a system, in which one or more warning lights are connected to a controller, which controller is also connected via a communication interface to a decision subsystem adapted to receive an activation signal from a delivery module providing the activation signal, which method comprises the following steps:
   a) delivery of the activation signal by the delivery module providing the activation signal to the decision subsystem
   b) generation of a request to turn the warning lights on or off by the decision subsystem based on the activation signal, and transfer of this request via the interface to the controller
   c) turning the warning lights on or off by the controller according to the request received in step b)
   characterised in that the delivery module generates the activation signal due to failure of one or more subsystems of the unmanned aerial vehicle or due to the unmanned aerial vehicle exit beyond a specified airspace being defined earlier as a spatial solid or its projection on the ground surface in which the unmanned aerial vehicle can stay and move.

2. The method according to claim 1, characterised in that a controller additionally connected to an ambient light sensor is used and the power of the warning lights is controlled depending on the ambient light intensity, in particular in that the power of the warning lights is reduced as the ambient light intensity decreases.

3. The method according to claim 1, characterised in that the delivery module used that is adapted to receive one or more of the signals from known air traffic safety systems, which may be generated by sources such as other aircraft or ground equipment: SAA (Sense and Avoid) or DAA (Detect and Avoid), ADS-B Mode A/C/S (Automatic Dependent Surveillance-Broadcast, Mode A/C/S), TCAS (Traffic Alert and Collision Avoidance System), TCAS-I I (Traffic Alert and Collision Avoidance System II wherein the delivery module provides said one or more of the signals as the activation signal.

4. The method according to claim 3, characterised in that in step b) the power of the activation signal is analyzed and in the case it exceeds a present threshold value—a request to turn the warning lights (4) on or off is generated.

5. The method according to claim 3, characterised in that in step b) the information contained in the activation signal, in particular that including the position and speed of the source of the signal, is analyzed, this information is compared with the position and speed data of the unmanned aerial vehicle and in the case of finding a risk of excessive approaching or collision of the source and the unmanned aerial vehicle—a request to turn the warning lights on or off is generated.

6. The method according to claim 1, characterised in that the delivery module generates the activation signal due to additional recognition of an object flying near the unmanned aerial vehicle by a vision technology.

7. The method according to claim 1, characterised in that a delivery module is located on an unmanned aerial vehicle is used.

8. The method according to claim 1, characterised in that a delivery module is used which is located outside the unmanned aerial vehicle, in particular on the ground.

9. The method according to claim 1, characterised in that LED warning lights or discharge lamps are used, preferably neon, mercury, argon, sodium, xenon, metal halogen, fluorescent ones.

10. A system for controlling the warning lights of an unmanned aerial vehicle, comprising one or more warning lights, in particular LED or discharge lamps, connected to a controller, which controller is also connected via a communication interface to a decision subsystem adapted to receive an activation signal from a delivery module providing the activation signal, wherein these elements are configured and programmed so that:
    a) the delivery module can provide the activation signal to the decision subsystem,
    b) the decision subsystem can generate a request to turn the warning lights on or off based on the activation signal and transfer this request via the interface to the controller,
    c) the controller can turn the warning lights on or off according to the request from the decision subsystem
    characterised in that the delivery module is configured and programmed so that it can generate the activation signal due to failure of one or more subsystems of an unmanned aerial vehicle or due to the unmanned aerial vehicle exit beyond a specified defined earlier as a spatial solid or its projection on the ground surface in which the unmanned aerial vehicle can stay and move.

11. A system according to claim 10, characterised in that it additionally comprises an ambient light sensor connected to a controller, wherein the controller is configured and programmed so that it can control the power of the warning lights depending on the ambient light intensity, in particular in that the power of the warning lights is reduced as the ambient light intensity decreases.

12. The system according to claim 10, characterised in that the delivery module is adapted to receive one or more of the signals from known air traffic safety systems, which may be generated by sources such as other aircraft or ground equipment: SAA (Sense and Avoid) or DAA (Detect and Avoid), ADS-B Mode A/C/S (Automatic Dependent Surveillance-Broadcast, Mode A/C/S), TCAS (Traffic Alert and Collision Avoidance System), TCAS-I I (Traffic Alert and Collision Avoidance System II), wherein the delivery module is configured and programmed so that it provides said one or more of the signals as the activation signal.

13. The system according to claim 12, characterised in that the decision subsystem is configured and programmed so that it can analyze the power of the activation signal and/or information contained in the activation signal, in particular that including the position and speed of the source of this signal.

14. The system according to claim 10, characterised in that the delivery module is configured and programmed so that it can generate the activation signal due to additional recognition of an object flying near the unmanned aerial vehicle by vision technology.

15. The system according to claim 10, characterised in that the delivery module is located on the unmanned aerial vehicle or located outside the unmanned aerial vehicle, in particular on the ground.

\* \* \* \* \*